US010724593B2

(12) United States Patent
Cis et al.

(10) Patent No.: US 10,724,593 B2
(45) Date of Patent: Jul. 28, 2020

(54) TORSION SPRING

(71) Applicant: Hamilton Sundstrand Corporation, Charlotte, NC (US)

(72) Inventors: Marcin Cis, Lutynia (PL); Piotr Sawicki, Bogdaniec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 2 days.

(21) Appl. No.: 15/935,265

(22) Filed: Mar. 26, 2018

(65) Prior Publication Data
US 2018/0274616 A1    Sep. 27, 2018

(30) Foreign Application Priority Data

Mar. 27, 2017    (EP) .................... 17461513

(51) Int. Cl.
| | | |
|---|---|---|
| F16K 31/06 | (2006.01) | |
| F16F 1/14 | (2006.01) | |
| F16F 1/02 | (2006.01) | |
| F15B 13/043 | (2006.01) | |
| B21D 28/02 | (2006.01) | |

(52) U.S. Cl.
CPC .............. *F16F 1/027* (2013.01); *B21D 28/02* (2013.01); *F15B 13/0436* (2013.01); *F15B 13/0438* (2013.01); *F16F 1/14* (2013.01); *F16K 31/0682* (2013.01); *F16F 2226/047* (2013.01); *F16F 2230/0005* (2013.01); *F16F 2230/0082* (2013.01); *F16F 2234/06* (2013.01); *F16F 2236/08* (2013.01); *Y10T 137/2278* (2015.04); *Y10T 137/2322* (2015.04); *Y10T 137/2365* (2015.04); *Y10T 137/2409* (2015.04)

(58) Field of Classification Search
CPC .......... F16K 31/0682; Y10T 137/2278; Y10T 137/2409; Y10T 137/2322; Y10T 137/2365; F15B 5/003; F15B 13/0436; F15B 13/0438; F16F 1/027; F16F 2230/0005; F16F 2230/0082; F16F 2226/047; F16F 2234/06; F16F 2236/08; B21D 28/02
USPC ........................................................ 137/82
See application file for complete search history.

(56) References Cited

U.S. PATENT DOCUMENTS

| | | | |
|---|---|---|---|
| 3,017,864 A | | 1/1962 | Atchley |
| 3,366,132 A | * | 1/1968 | Fore .................... F15B 13/0438 137/82 |
| 3,517,359 A | | 6/1970 | Trbovich |
| 3,535,563 A | | 10/1970 | Mooney et al. |
| 3,714,610 A | | 1/1973 | Duff et al. |
| 3,934,816 A | | 1/1976 | Terrell et al. |

(Continued)

FOREIGN PATENT DOCUMENTS

| | | |
|---|---|---|
| EP | 2202010 A2 | 6/2010 |
| EP | 2985894 A1 | 2/2016 |

(Continued)

OTHER PUBLICATIONS

Extended European Search Report for International Application No. 17461513.8 dated Oct. 10, 2017, 7 pages.

*Primary Examiner* — Matthew W Jellett
(74) *Attorney, Agent, or Firm* — Cantor Colburn LLP (57) ABSTRACT

There is provided a method of manufacturing a torsion spring, comprising providing a section of sheet metal, and forming the torsion spring from the section of sheet metal.

6 Claims, 5 Drawing Sheets

(56) References Cited

U.S. PATENT DOCUMENTS

| | | | |
|---|---|---|---|
| 4,131,130 A * | 12/1978 | Ruby | F15B 13/0438 |
| | | | 137/596.17 |
| 4,490,705 A | 12/1984 | Mueller | |
| 5,184,645 A | 2/1993 | Boerschig | |
| 2005/0012060 A1 | 1/2005 | Dzialakiewicz | |
| 2010/0154504 A1* | 6/2010 | Cunha | B21D 19/005 |
| | | | 72/340 |
| 2013/0048891 A1* | 2/2013 | Druhan | F15B 13/0438 |
| | | | 251/129.15 |
| 2016/0215898 A1 | 7/2016 | Laboda et al. | |

FOREIGN PATENT DOCUMENTS

| | | |
|---|---|---|
| GB | 1264859 A | 2/1972 |
| JP | S6283571 A | 4/1987 |

\* cited by examiner

TORSION SPRING

FOREIGN PRIORITY

This application claims priority to European Patent Application No. 17461513.8 filed Mar. 27, 2017, the entire contents of which is incorporated herein by reference.

FIELD

The present invention relates generally to torsion springs, in particular those used in servo valves (e.g., electrohydraulic servo valves), as well as methods for manufacturing torsion springs, more particularly methods involving the manufacture of a torsion spring from sheet metal.

BACKGROUND

A torsion spring is typically provided in a servo valve, for example an electrohydraulic servo valve incorporating a flapper nozzle assembly. The torsion spring may be connected to the armature of the servo valve to bias the armature and the component connected thereto (e.g., the flapper) towards a rest position. The torsion spring may, therefore, be seen as a negative feedback mechanism to the movement of the magnetic armature.

Due to the tolerances and small movements in a servo valve, the stiffness of a torsion spring has to be determined and manufactured precisely. Furthermore, a torsion spring will typically be subject to a high number of use cycles (e.g., 10 per minute), and resistance to fatigue is also an important factor when designing and/or manufacturing this component.

It is desired to provide an improved torsion spring, and improved methods for manufacturing torsion springs.

SUMMARY

In accordance with an aspect of the present disclosure, there is provided a method of manufacturing a torsion spring, comprising providing a section of sheet metal, and forming the torsion spring from the section of sheet metal.

It has been found that manufacturing the torsion spring from sheet metal leads to improvements in the resistance to fatigue of the torsion spring over time, and also enables more precise manufacturing of the torsion spring. For example, the dimensions of the torsion spring can be more precisely tuned in order to provide a specific stiffness for a particular torsion spring, as well as more consistency when manufacturing a large volume of torsion springs.

The section of sheet metal may have a uniform thickness, e.g., less than 1 mm, 0.8 mm, 0.6 mm, 0.5 mm, 0.4 mm or 0.3 mm.

The step of forming may comprise cutting out and/or stamping the torsion spring from the section of sheet metal. The step of forming may comprise or further comprise one or more of: using a machine press or stamping press, laser cutting, wire-cut electrical discharge machining (EDM), blanking, embossing, bending, flanging, and coining.

The method may further comprise determining a set of dimensions of the torsion spring required to achieve a specific stiffness of said torsion spring, and forming the torsion spring with the determined set of dimensions.

The torsion spring may comprise a first portion configured for attachment to a fixed housing, a second portion configured for attachment to a moving component, and one or more torsion members connecting the first portion with the second portion.

The set of dimensions may comprise one or more dimensions of the one or more torsion members, for example a width of the one or more torsion members.

The set of dimensions may comprise a thickness of the torsion spring.

The width of the torsion members may be increased, and/or the thickness of the torsion spring may be increased, to provide a stiffer torsion spring, or a greater resistance to movement (e.g., twisting) in use. The width of the torsion members may be reduced, and/or the thickness of the torsion spring may be decreased, to provide a less stiff torsion spring, or a lower resistance to movement (e.g., twisting) in use.

The method may comprise forming a plurality of torsion springs from the section of sheet metal, wherein each torsion spring may be produced using any of the methods described above and herein.

The method may comprise determining a set of dimensions of each torsion spring required to achieve a specific stiffness of each of said torsion springs, and forming each torsion springs with the determined set of dimensions.

The specific stiffness and/or the set of dimensions may be the same, such that each torsion spring of the plurality of torsion springs has a consistent stiffness.

In accordance with an aspect of the present disclosure, there is provided a torsion spring formed from sheet metal. The torsion spring may be a substantially flat, single-piece of material.

The torsion spring may further comprise a first portion configured for attachment to a fixed housing, a second portion configured for attachment to a moving component, and one or more torsion members connecting the first portion with the second portion.

The torsion spring may have a uniform thickness, e.g., less than 1 mm, 0.8 mm, 0.6 mm, 0.5 mm, 0.4 mm or 0.3 mm.

The torsion spring may have a length defined along its longitudinal axis, and the thickness of the torsion spring (e.g., perpendicular to its length) may be at least 20, 30, 40, 50, 60, 70, 80, 90 or 100 times smaller than its length.

In accordance with an aspect of the present disclosure, there is provided an assembly comprising an armature and flapper assembly for a servo valve, and a torsion spring as described above. The fixed housing may be the housing of the servo valve, and the moving component may be an armature and/or flapper of the servo valve.

The plane formed by a major surface of the torsion spring may be perpendicular to the plane formed by a major surface of the armature.

Generally, the materials used to make the torsion springs of the present disclosure may include Inconel 625, Inconel 718 and A286. Although not essential to the broadest aspects of the present disclosure, fatigue properties of such materials do not significantly decrease in terms of occurring high temperatures.

In any of the aspects or embodiments disclosed herein, the thickness of the torsion spring may be less than 1 mm, 0.8 mm, 0.6 mm, 0.5 mm, 0.4 mm or 0.3 mm. The length of the torsion spring may be greater than, less than or equal to 10 mm, 20 mm, 30 mm, 40 mm or 50 mm, or may be between 10-50 mm or 20-40 mm. The width of the torsion members may be less than 10 mm, 5 mm, 4 mm, 3 mm, 2 mm or 1 mm. As discussed herein, these parameters may be varied to suit a particular application.

BRIEF DESCRIPTION OF THE DRAWINGS

Various embodiments will now be described, by way of example only, and with reference to the accompanying drawings in which.

DETAILED DESCRIPTION

Figure 1A:
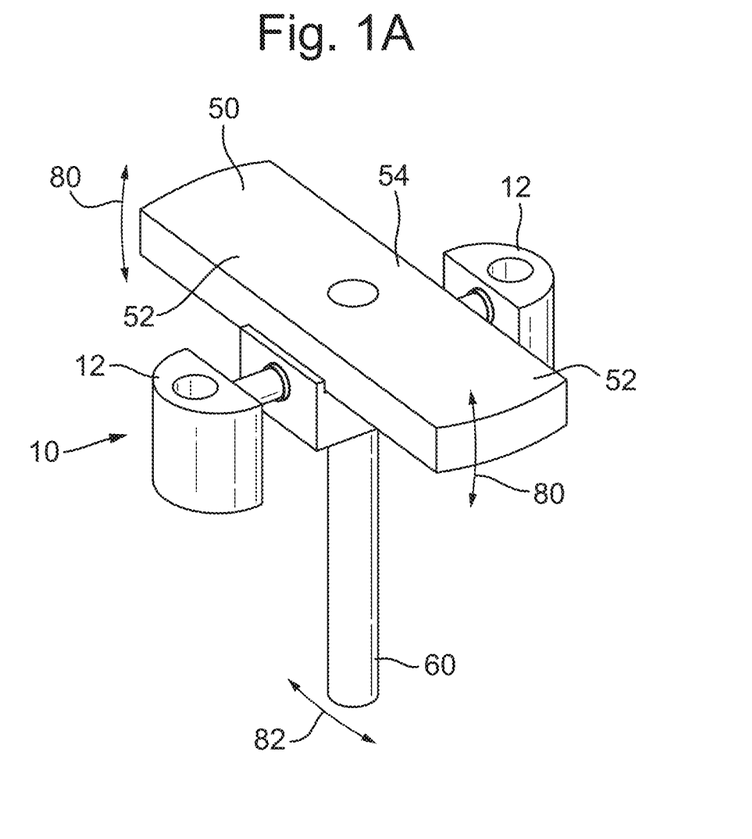
FIG. 1A shows a conventional torsion spring connected to an armature of a servo valve.
Figure 1B:
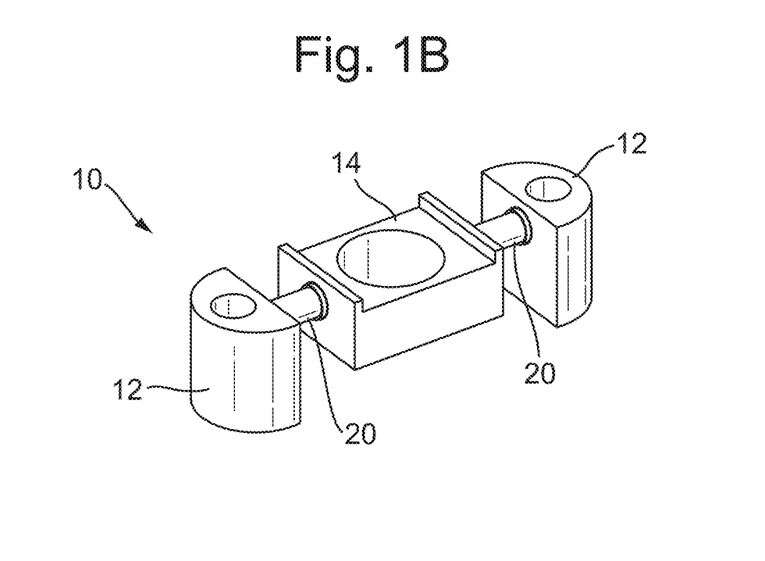
FIG. 1B shows the torsion spring of FIG. 1A in isolation.

FIGS. 1A and 1B show a conventional arrangement in which a torsion spring 10 is connected to a magnetic armature 50 and a flapper 60. The armature 50 comprises side portions 52 either side of a central portion 54. The flapper 60 is shown in FIG. 1A as connected to and extending through the armature 50 at its central portion 54. In use, the armature 50 moves around its pivot point located at its central portion 54, such that the side portions 52 move up and down as indicated by the arrows 80. This movement causes the flapper 62 move side to side in the direction of arrow 82.

The torsion spring 10 comprises end portions 12 that connect to a housing (e.g., a servo valve housing) such that the end portions 12 do not move due to any movement of the armature 50 or flapper 62. However, the torsion spring 10 comprises cylindrical torsion members 20 that connect the fixed end portions 12 to a movable central portion 14. In use, as the armature 50 rotates, and the flapper 62 move side to side the torsion members 20 are configured to twist to allow the central portion 14 to move with the armature 50 to which it is connected.

As the torsion members 20 are connected to the fixed end portions 12 the torsion spring 10 functions to resist the movement of the armature 50 and flapper 62. In other words, the torsion spring 10 biases the armature 50 and flapper 62 towards a rest position.

The conventional design, whilst effective, has some limitations. Firstly, the various parts, such as the end portions 12 and the torsion members 20, have different shapes and lack a common manufacturing process. Furthermore, the stiffness is very sensitive to the diameter of the cylindrical torsion members 20, which can make manufacturing tolerances fairly large. Finally, and especially the case of low stiffness specifications, manufacturing can be challenging due to the diameter of the torsion members 20 becoming very small.

In accordance with the present disclosure, a torsion spring is manufactured as a flat, one-piece member, for example manufactured from sheet metal, wherein the dimensions of the torsion spring may be modified by changing the sheet thickness and/or the forming techniques used to form the torsion spring from the sheet metal.

Figure 2A:
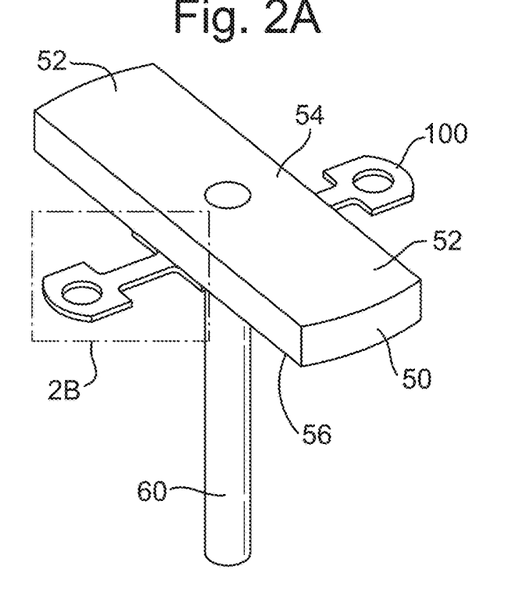
FIG. 2A shows a torsion spring according to an embodiment of the disclosure connected to an armature of the servovalve.

FIG. 2A shows an arrangement of the present disclosure in which a torsion spring 100 is connected to a magnetic armature 50 and a flapper 60. The armature 50 is substantially the same as the armature 50 described above in respect of FIG. 1A, comprising side portions 52 either side of a central portion 54. The flapper 60 connects to and extends through the armature 50 at the central portion, and the movements of the armature 50 and flapper 60 are the same as those described above in respect of FIG. 1A.

Figure 2B:
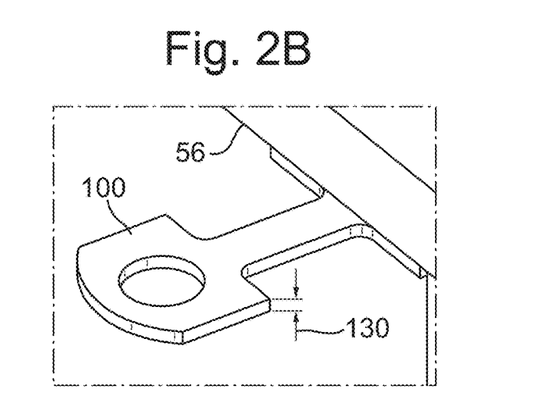
FIG. 2B shows a close-up of FIG. 2A.

The torsion spring 100 may extend underneath the armature 50 and may be connected to the bottom surface 56 of the armature 50 by any suitable means, for example fasteners for a suitable adhesive. Other types of connection are possible, for example the torsion spring 100 may be connected to top surface of the armature 50, and/or in various other orientations (see, e.g., FIGS. 3A and 3B). FIG. 2B shows a close-up of the square "2B" in FIG. 1A, from which the connection to the underside of the armature 50 can be seen in more detail.

Figure 2C:
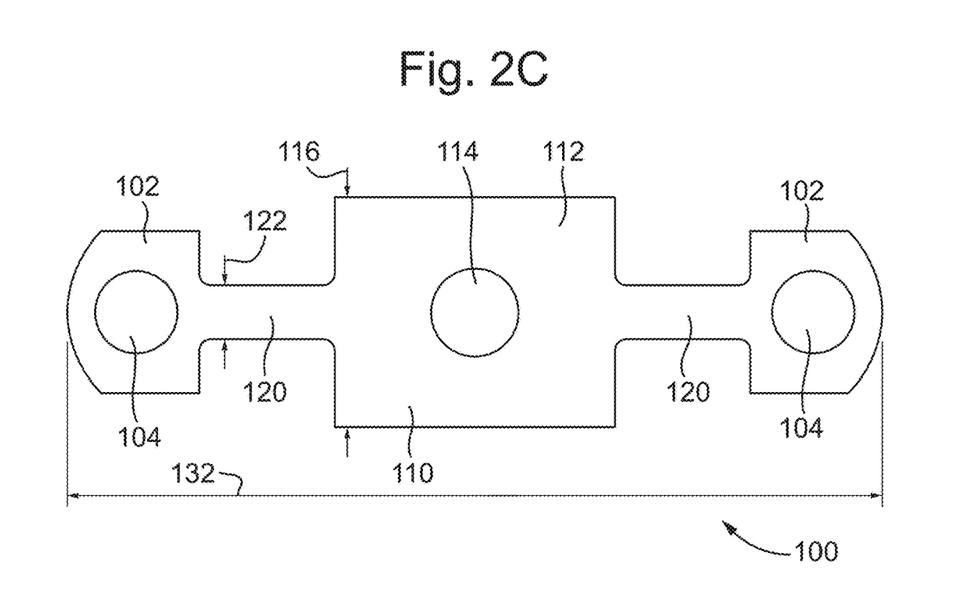
FIG. 2C shows the torsion spring of FIG. 2A in isolation.

FIG. 2C shows the torsion spring 100 in isolation. The torsion spring 100 comprises opposed first, or end portions 102 for connecting to a housing (e.g., a servo valve housing). The end portions 102 may be fixed with respect to the housing, such that they do not move in response to movement of the armature 50 and/or flapper 60. The end portions 102 may comprise apertures 104 so that the end portions 102 may be attached to the housing by suitable attachment members (e.g., fasteners).

The torsion spring 100 comprises a second, or central portion 110 for connecting the torsion spring 100 to the movable armature 50. The central portion 110 may comprise a flat surface 112 configured to contact a surface of the armature 50 as described above. The central portion 110 may comprise an aperture 114 through which the flapper 60 may extend in use.

The central portion 110 is connected to the end portions 102 via respective torsion members 120. Each torsion member 120 may be substantially flat and configured to twist in use to allow movement of the armature 50 and flapper 60. Although allowing such movement, the torsion members 120 function to resist this movement and bias the armature 50 and flapper 60 towards their rest positions. Although depicted as substantially rectangular in FIGS. 2A-2C, the torsion members 120 may be any suitable shape as long as they are substantially flat. The width 122 of the torsion members 120 may be less than the width of the end portions 102 and/or central portion 110.

The torsion spring 100 itself has a substantially uniform thickness, and may be formed by any suitable technique. In particular, the torsion spring 100 may be manufactured from sheet metal, for example along with other torsion springs formed from the same sheet. The sheet metal used to form the torsion spring 100 may have a substantially uniform thickness, allowing the torsion spring 100 to also have its substantially uniform thickness.

The thickness 130 of the torsion spring 100 may be very thin as compared to the length 132 of the torsion spring 100. For example, the thickness 130 of the torsion spring 100 may be at least 20, 30, 40, 50, 60, 70, 80, 90 or 100 times smaller than the length 132 of the torsion spring 100.

Figure 3A:
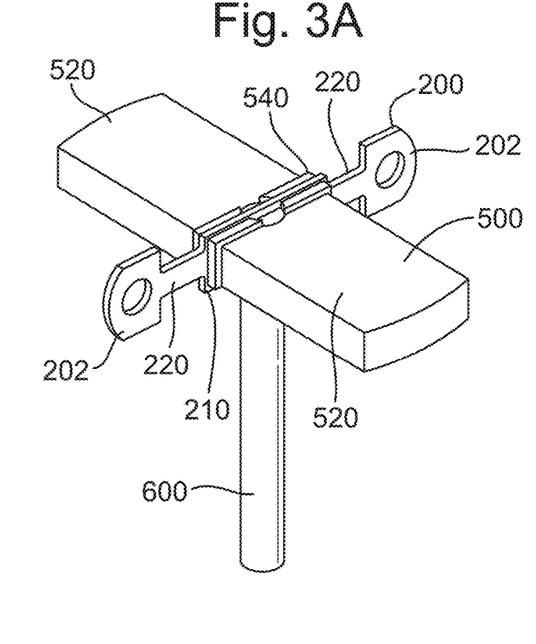
FIG. 3A shows the torsion spring of FIG. 2A connected in a different manner to an armature of a servo valve, according to another embodiment of the disclosure.

FIG. 3A shows a different embodiment of a torsion spring 200, which is operatively connected to an armature 500 and flapper 600. The armature 500 is substantially the same as the armature 500 described above in respect of FIGS. 1A and 2A, comprising side portions 520 either side of a second, or central portion 540. The flapper 600 connects to and extends through the armature 500 at the central portion, and the movements of the armature 500 and flapper 600 are the same as those described above in respect of FIG. 1A.

The torsion spring 200 comprises first, or end portions 202 connected to a central portion 210 via torsion members 220. The end portions 202 and the torsion members 220 may be substantially the same as, and comprise similar features to any of the end portions 202 and/or torsion members 120 described above.

Figure 3B:
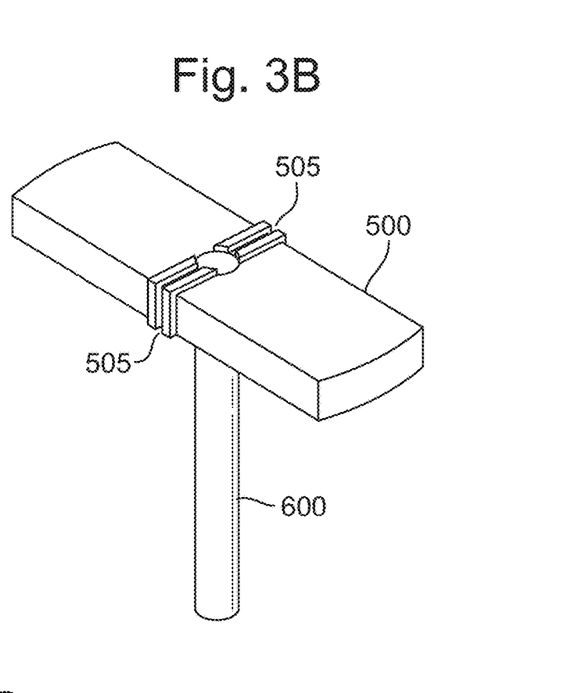
FIG. 3B shows an armature with comprises one or more lateral slots into which the torsion spring of FIG. 3A fits.

The main difference between the torsion spring 200 of FIG. 3A and the torsion spring 100 shown in, e.g., FIG. 2C is that the plane formed by a or the major surface(s) of the torsion spring 200 perpendicular to a or the plane formed by the major surface(s) of the armature 500. By "major surface", it is meant the surface or surfaces of the object in question having the largest surface area, e.g., the lower surface 56 of the armature 50. As shown in FIG. 3B, the armature 500 comprises one or more lateral slots 505 into which the torsion spring 200 fits.

Figure 3C:
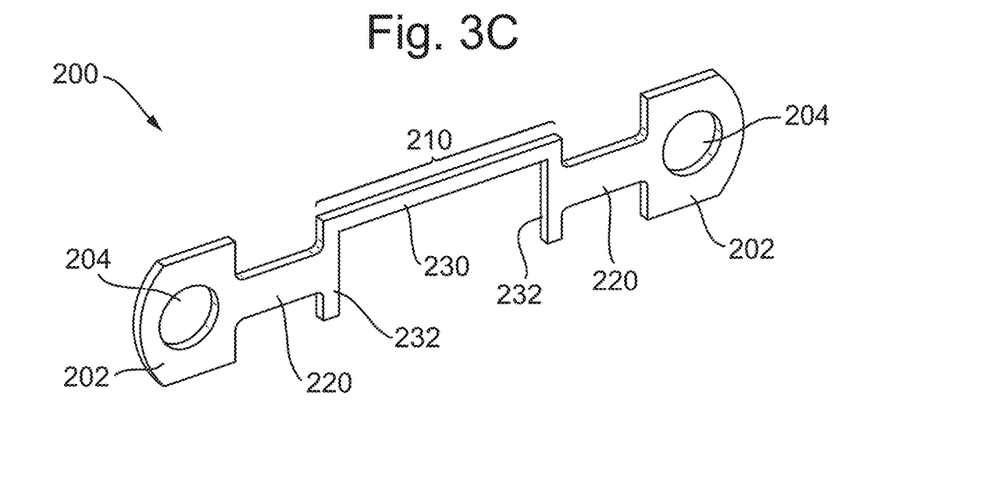
FIG. 3C shows the torsion spring of FIG. 3A in isolation.

FIG. 3C shows the torsion spring 200 in isolation. The torsion spring 200 comprises the opposed first, or end portions 202 for connecting to a housing (e.g., a servo valve housing). The end portions 202 may be fixed with respect to the housing, such that they do not move in response to movement of the armature 500 and/or flapper 600. The end portions 202 may comprise apertures 204 so that the end portions 202 may be attached to the housing by suitable attachment members (e.g., fasteners).

The torsion spring 200 comprises a second, or central portion 210 for connecting the torsion spring 200 to the movable armature 500. The central portion 210 may comprise a base portion 230 and two side portions 232 extending from either end of the base portion 230. The base portion 230 and the side portions 232 may be configured to slot into the one or more lateral slots 505 of the armature 500, and may be held in place within the one or more lateral slots 505 by an interference or press fit. The torsion members 220 may interconnect each end portion 202 with a respective side portion 232, and may be configured to twist in use to allow movement of the armature 500 and flapper 600. Although allowing such movement, the torsion members 220 function to resist this movement and bias the armature 500 and flapper 600 towards their rest positions. Although depicted as substantially rectangular in FIGS. 3A and 3C, the torsion members 220 may be any suitable shape as long as they are substantially flat. The width 222 of the torsion members 220 may be less than the width of the end portions 202 and/or central portion 210.

Orienting the torsion spring 200 in the manner shown in FIG. 3A can mean that the torsion spring 200 has a higher resistance to movement of the armature 500 and flapper 600 that may be provided by the torsion spring 100 of FIG. 2A with equivalent dimensions. This provides additional support and further design options when incorporating a torsion spring into, e.g., a servo valve.

Figure 4:
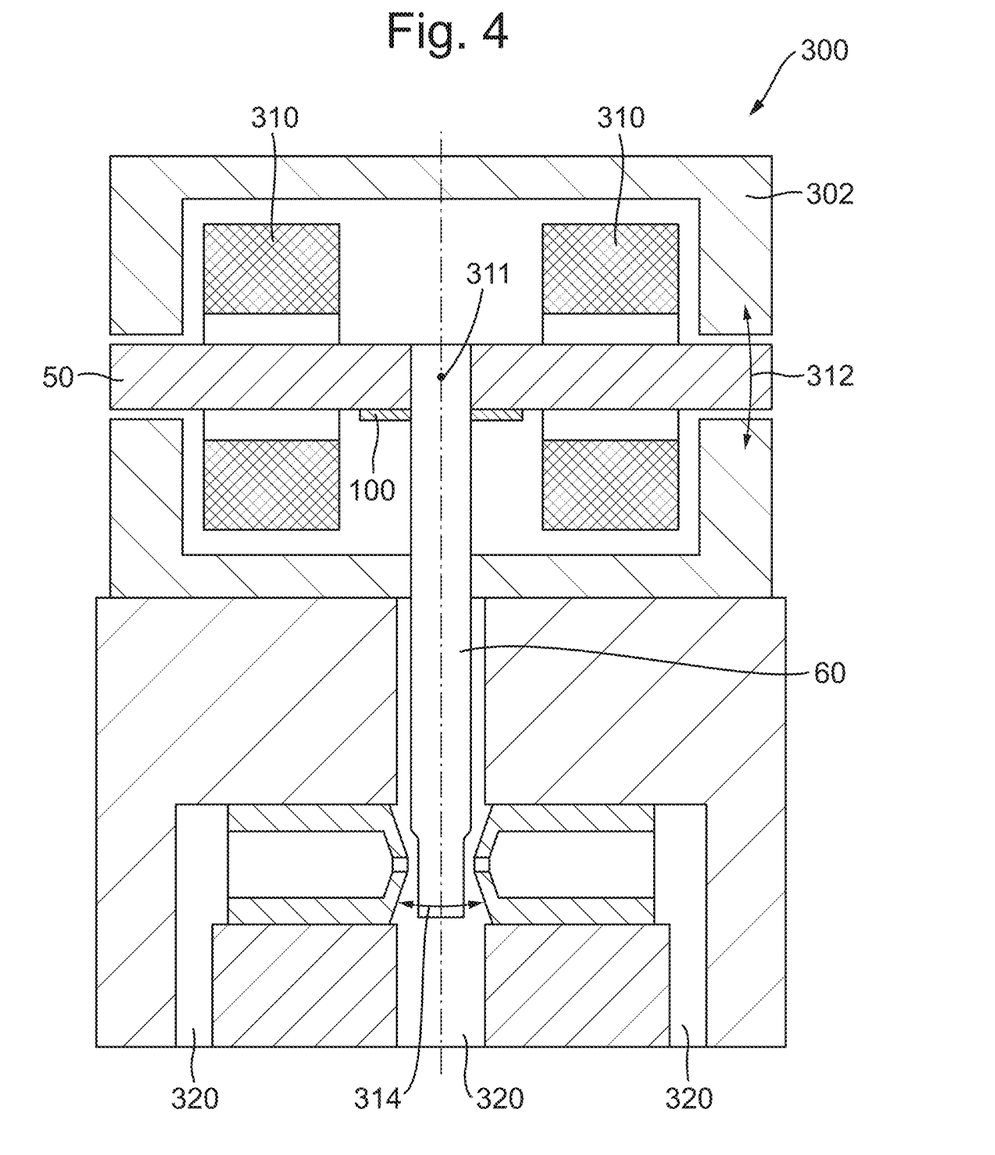
FIG. 4 shows the torsion spring of FIG. 2A within a servo valve.

FIG. 4 shows a servo valve 300 incorporating the armature 50, flapper 60 and torsion spring 100 as described above in respect of FIGS. 2A-2C. The servo valve 300 is schematically depicted (certain components not pertinent to the present disclosure have been omitted), and it will be appreciated that the armature 50, flapper 60 and torsion spring 100 could be replaced by the armature 500, flapper 600 and torsion spring 200 of FIGS. 3A-3C, or any other suitable armature, flapper and torsion spring within the broadest aspects of the present disclosure.

The servo valve 300 is a nozzle-flapper type servo valve and includes a housing 302, within which is located the armature 50, flapper 60 and torsion spring 100, which are held in place by fasteners and/or other suitable components. Electromagnetic coils 310 are located around the arm portions of the armature 50, and are configured to rotate the armature 50 about its pivot point 311, and in the direction shown by arrow 312. This causes the flapper 60 to rotate as well (about the same pivot point), and move in the direction shown by arrow 314. Such movement will cause actuation of a component connected to the servo valve, for example by moving a control spool (not shown) via one or more fluid pathways 320, as is known in the art.

Figure 5:
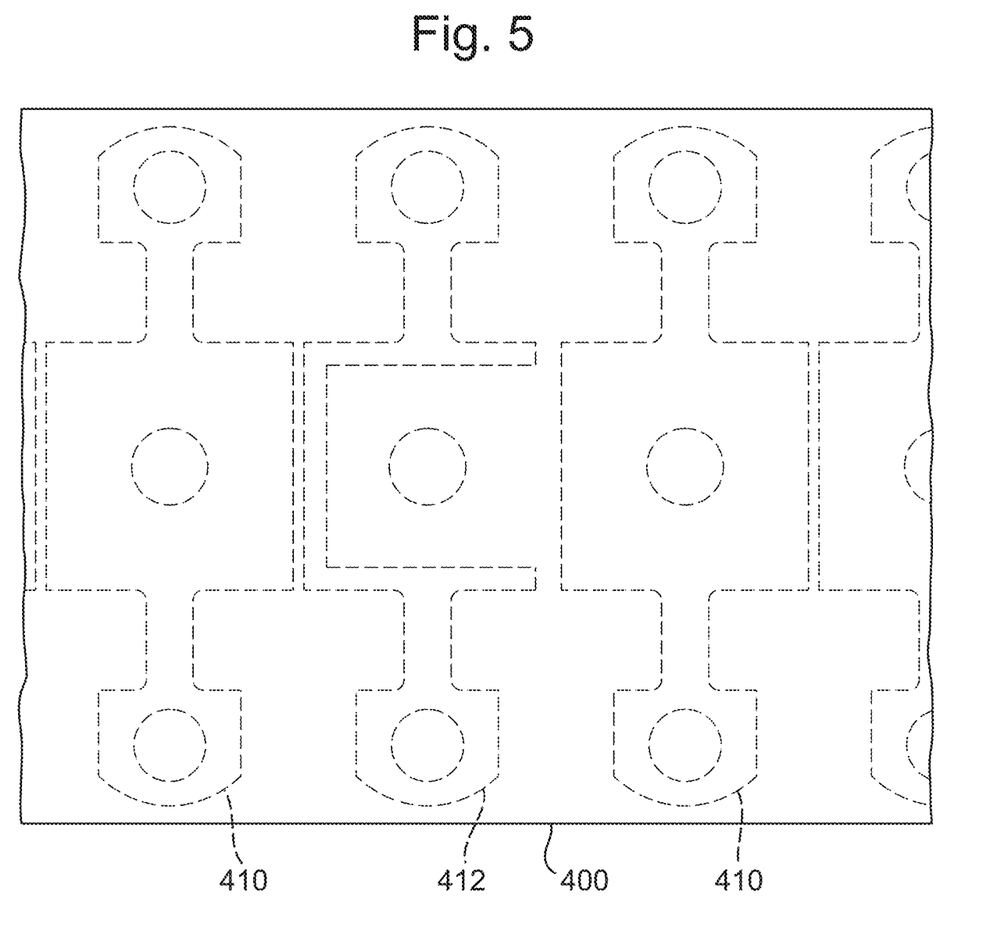
FIG. 5 depicts a method for manufacturing either or both of the torsion springs previously disclosed.

A method for manufacturing either or both of the torsion springs 100, 200 is depicted in FIG. 5 and may comprise providing a section of sheet metal 400, e.g., a flat, single-piece of sheet metal, and forming the torsion spring(s) 100, 200 from the sheet metal. The forming may comprise cutting out or stamping the torsion spring(s) 100, 200 from the section of sheet metal 400 according to a given pattern 410, 412. A first pattern 410 may correspond to the torsion spring 100 of FIGS. 2A-2C, and a second pattern 412 may correspond to the torsion spring 200 of FIGS. 3A-3C.

A variety of sheet metal forming manufacturing processes may be used in the forming (and, e.g., the cutting out or stamping), such as punching using a machine press or stamping press, laser cutting, wire-cut electrical discharge machining (EDM), blanking, embossing, bending, flanging, and coining.

In one particular embodiment, and referring to the torsion spring 100 (although the same principles may be applied to the torsion spring 200 and other torsion springs within the broadest scope of the present disclosure), the section of sheet metal may have a width substantially corresponding to the width of the centre portion 110. The end portions 102, and torsion members 120 may be formed by cutting out or stamping suitable lengths of the sheet metal as it passes through one or more cutters and/or stamps.

In any of the aspects embodiments disclosed herein, the width of the torsion member and/or thickness of the sheet metal may be varied in order to change the stiffness of the torsion members, and the ability of the torsion spring to resist the movement of the armature and flapper. These parameters may be adjusted during the manufacture of multiple torsion springs (e.g., from a single piece of sheet metal), so that each torsion spring has a specific (e.g., different or tailored) stiffness. The ability to tailor a torsion spring in this manner (i.e., by forming from a flat piece of sheet metal) leads to better uniformity of stiffness and strength, for example when a large number of torsion springs 100 are to be produced having the same stiffness or strength, or each having a specific stiffness or strength. Furthermore, the adjustability of the manufacturing process may be simplified, due to the ease at which the width of the torsion members be adjusted, for example simply by moving the press platens of a machine press closer together, or adjusting the parameters of a laser-guided cutter. This may allow more flexibility in the design of the torsion spring.

Although the present invention has been described with reference to preferred embodiments, it will be understood by those skilled in the art that various changes in form and detail may be made without departing from the scope of the invention as set forth in the accompanying claims.

The invention claimed is:
1. An assembly comprising:
   an armature and flapper assembly for a servo valve, wherein the armature comprises two side portions positioned on either side of a central portion, the flapper is connected to and extending through the armature at its central portion, and a longitudinal axis of the armature is perpendicular to a longitudinal axis of the flapper; and a torsion spring from sheet metal, wherein the torsion spring is a substantially flat, single-piece of material;

wherein the armature comprises one or more lateral slots into which the torsion spring fits.

2. An assembly as claimed in claim 1, wherein the plane formed by a major surface of the torsion spring is perpendicular to the plane formed by a major surface of the armature.

3. The assembly as claimed in claim 1, wherein the torsion spring further comprises:

a first portion configured for attachment to a fixed housing;

a second portion configured for attachment to a moving component, wherein the second portion comprises a base portion and two side portions extending from either end of the base portion, and wherein the base portion and two side portions slot into the one or more lateral slots of the armature; and one or more torsion members connecting the first portion with the second portion.

4. The assembly as claimed in claim 3, wherein the base portion and two side portions are held into place within the one or more lateral slots by an interference or press fit.

5. The assembly as claimed in claim 1, wherein the torsion spring is completely flat and has a uniform thickness.

6. The assembly as claimed in claim 1, wherein the torsion spring has a length defined along its longitudinal axis, and the thickness of the torsion spring is at least 20 times smaller than its length.

* * * * *